United States Patent [19]
Takada

[11] Patent Number: 5,039,261
[45] Date of Patent: Aug. 13, 1991

[54] SPINDLE DEVICE FOR USE IN MACHINE TOOL
[75] Inventor: Toru Takada, Bisai, Japan
[73] Assignee: Brother Kogyo Kabushiki Kaisha, Aichi, Japan
[21] Appl. No.: 527,323
[22] Filed: May 23, 1990
[30] Foreign Application Priority Data
  May 26, 1989 [JP] Japan .................. 1-133480
[51] Int. Cl.⁵ .............. B23B 31/26; B23C 5/26; B23C 5/28
[52] U.S. Cl. ....................... 409/136; 279/4; 408/57; 409/233
[58] Field of Search ........... 409/233, 231, 232, 234, 409/136, 135; 408/56, 57, 59, 60, 61; 279/4

[56] References Cited
U.S. PATENT DOCUMENTS

| | | | |
|---|---|---|---|
| 3,893,371 | 7/1975 | Frazier | 409/231 X |
| 4,762,447 | 8/1988 | Marantette | 279/4 X |
| 4,898,397 | 2/1990 | Smith | 279/4 |
| 4,921,376 | 5/1990 | Tani et al. | 409/131 |

Primary Examiner—Steven C. Bishop
Attorney, Agent, or Firm—Oliff & Berridge

[57] ABSTRACT

A spindle device providing a hydraulic system for moving a drawbar in a tool holding direction. The drawbar extends through a spindle shaft and is slidably provided therein. A piston is fixedly connected to the drawbar, and a pressure chamber is defined by the spindle shaft, the drawbar and the piston. Upon application of hydraulic pressure in the pressure chamber, the piston as well as the draw bar are moved in the tool holding direction. In one embodiment, at least one free piston is provided in the pressure chamber for dividing the same into first and second pressure chambers. The hydraulic pressure is applied to the first chamber to urge the free piston toward the second pressure chamber in which a liquid is hermetically accumulated. The liquid pressure within the second pressure chamber is increasable higher than the hydraulic pressure for urging the piston toward the tool holding direction with an increased force.

8 Claims, 3 Drawing Sheets

SPINDLE DEVICE FOR USE IN MACHINE TOOL

BACKGROUND OF THE INVENTION

The present invention relates to a spindle device for use in a machine tool, and more particularly, to a type thereof in which an improvement is made on lifting and suspending a tool detachably secured thereto.

In a conventional spindle device for use in a machine tool, a drawbar provided in the spindle unit is moved to a direction opposite a tool attaching direction by way of a force which is generated when a biasing means such as a belleville spring is compressed. In response to this movement of the drawbar, a tool holding member provided at a tip end portion of the drawbar is closed for lockingly supporting the tool. Further, the tool is fixedly secured to the spindle by pulling up a pullstud of the tool by the drawbar.

On the other hand, for detaching the tool from the spindle, a rear end portion of the drawbar is depressed by a depression means such as a hydraulic cylinder, so that the drawbar is moved toward the tool against the biasing force of the biasing means. By this movement, the tool holding member is opened for releasing the pullstud, whereby the tool is detachable from the spindle.

With such conventional arrangement, sufficiently large biasing force of the biasing means is required, for example, about 1000 kgf in BT40 scale, in order to securely hold the tool. For this purpose, the biasing means must provide large biasing force. Accordingly, in the conventional spindle device, large force is required for changing an assembled tool for a new tool. Further, due to exertion of large biasing force, large thrusting load is imparted on a bearing, to lower a service life thereof.

If a belleville spring is used as the biasing means, the spring may be displaced from a rotation center of the spindle when the latter is rotated at high speed, to thereby provide operational imbalance. On the other hand, if a coil spring is used for the biasing means, the resultant spindle becomes bulky, since a mass of the coil spring is larger than that of the belleville spring.

SUMMARY OF THE INVENTION

It is therefore, an object of the present invention to overcome the above described deficiencies, and to provide an improved spindle device capable of generating a tool clamping or holding force without using a biasing means.

Another object of the invention is to provide such device capable of generating a force for holding the tool even by a small hydraulic pressure source.

These and other objects of the invention will be attained by providing a spindle device for holding a tool for use in a machine tool, including a spindle shaft rotatably provided about its axis, and a drawbar extending through the spindle shaft and disposed slidable in an axial direction thereof relative to the spindle shaft for holding the tool, the drawbar having an outer peripheral surface, the improvement comprising the drawbar being formed with a fluid passage, a hollow space being defined between the outer peripheral surface of the drawbar and an inner peripheral surface of the spindle shaft, a piston fixedly coupled to the drawbar and disposed slidable in the hollow space, a pressure chamber being defined by the inner and outer peripheral surfaces and the piston, the fluid passage being in fluid communication with the pressure chamber, and liquid supply means connected to the fluid passage for supplying pressurized liquid into the pressure chamber for urging the piston and the drawbar in a direction for holding the tool.

When the pressurized liquid is supplied into the pressure chamber through the fluid passage formed in the drawbar, the piston is urged toward the tool holding direction, so that the drawbar is also moved to the tool holding direction. As a result, the tool engageable with the drawbar is subjected to strong holding force.

DETAILED DESCRIPTION OF THE PREFERRED EMBODIMENTS

Figure 1:
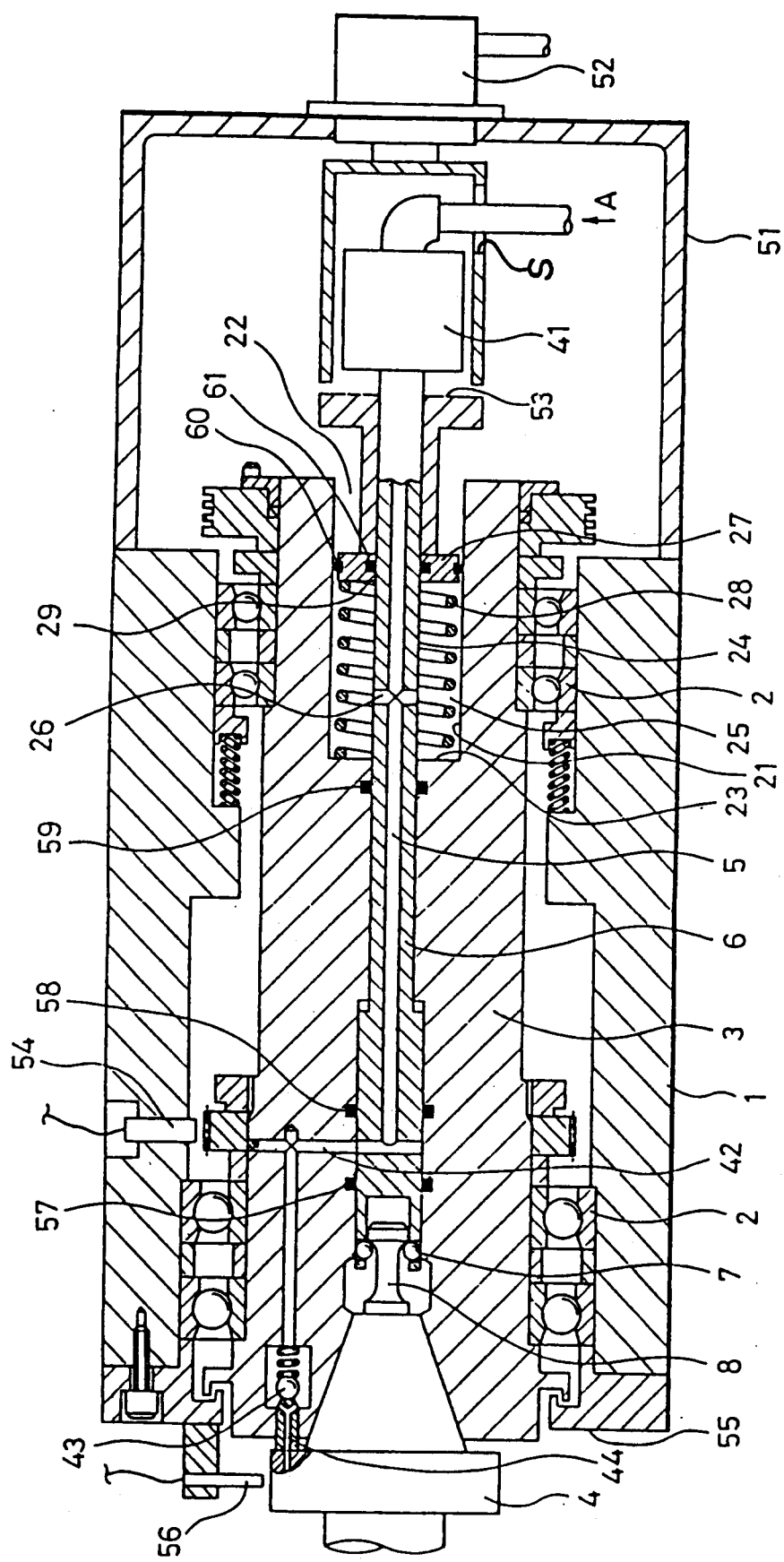
FIG. 1 is a cross-sectional view showing a spindle device in its tool holding state according to a first embodiment of this invention.

A spindle device according to a first embodiment of this invention will be described with reference to FIGS. 1 and 2. The spindle device includes an outer cylindrical body 1 and a spindle shaft 3 positioned in the cylindrical body 1 and rotatably supported thereby through four bearings 2. A drawbar 6 is provided in the spindle shaft 3. The drawbar 6 extends in an axial direction of the spindle shaft 3 and is positioned along a rotational center thereof. The drawbar 6 is slidably positioned with respect to the spindle shaft 3 in the axial direction for the attachment and detachment of a tool 4 and is rotatable together with a rotation of the spindle shaft 3. Within the drawbar 6, a fluid passage 5 is formed which extends in an axial direction thereof.

The drawbar 6 has a tip end portion (left side in FIG. 1) provided with a tool holding member 7 for an engagement of a pullstud 8 provided at a rear end of the tool 4. More specifically, as shown in FIG. 1, when the drawbar 6 is moved rearwardly (rightwardly in FIG. 1) within the spindle shaft 3, the tool holding member 7 is brought into engagement with the pullstud 8, so that the tool 4 is secured to the spindle shaft 3. On the other hand, when the drawbar 6 is moved frontwardly (leftwardly in FIG. 2) within the spindle shaft 3, the tool holding member 7 is brought into disengagement from the pullstud 8 of the tool 4, so that the tool 4 is released from the spindle shaft 3.

The spindle shaft 3 has a rear end portion formed with an elongated recess 22 which has a cylindrical inner peripheral surface 21 and a flat bottom surface 23. As shown, the drawbar 6 also extends through the recess 22, and a piston 27 is fixedly secured to the drawbar 6 and is slidably movable within the cylindrical inner surface 21. As a result, a fluid pressure chamber 25 is defined by the inner peripheral surface 21, the bottom surface 23, a portion of an outer peripheral surface 24 of the drawbar 6 and a front surface 29 of the piston 27. A coil spring 28 is provided within the pressure chamber 25 and disposed over the drawbar 6. The coil spring 28 has one end seated on the bottom surface 23 and another end seated on the front surface of the piston 27.

A radial communication passage 26 is formed in the drawbar 6 so as to provide fluid communication between the fluid passage 5 and the fluid pressure chamber 25. Upon application of highly pressurized machining liquid into the fluid pressure chamber 25 through the fluid passage 5 and the communication passage 26, the piston 27 is moved within the pressure chamber 25, so that the drawbar 6 provided integral with the piston 27 is moved in the axial direction.

Next, a hydraulic system of the spindle device will be described. A highly pressurized liquid source (not shown) is connected to the fluid passage 5 through a rotary joint 41 coupled to a rear distal end of the drawbar 6, and flows in a direction indicated by an arrow A. A part of the liquid is introduced into the pressure chamber 25 through the communication passage 26, and the remaining liquid is supplied to the tool 4. For the supply of the liquid to the tool 4, a communication passage 42 is formed in a radial direction of the spindle shaft 3 in fluid communication with the fluid passage 5. The communication passage 42 is communicated with a communication passage 44 connected to the tool 4 via a check valve 43 positioned at the front end portion of the spindle shaft 3.

A rear cup member 51 is fixed to a rear end portion of the outer cylindrical body 1, and a hydraulic cylinder 52 is attached to a rear wall of the rear cup member 51. The hydraulic cylinder 52 is selectively abuttable to the rear end portion 53 of the drawbar 6. Upon actuation of the hydraulic cylinder 52 for pushing the rear end portion 53 of the drawbar 6, the drawbar 6 as well as the piston 27 are pushed frontwardly against the biasing force of the coil spring 28.

A rotation detector 54 is fixedly provided at the outer cylindrical body 1 for detecting the rotation phase of the main spindle 3. A front plate 55 is provided to cover a front open end of the outer cylindrical body 1. The front plate 55 is provided with a second detector 56 for detecting existence of the tool 4. If detections are made on the tool holding state as well as the rotation phase of the spindle shaft by the sensors 56 and 54, a liquid supplying unit including a pump (not shown) is automatically operated for supplying the highly pressurized liquid to the rotary joint 41. On the other hand, if the tool is not held by the spindle shaft, or if the spindle shaft 3 is not rotated about its axis, the operation of the liquid supplying unit is automatically stopped, to thereby automatically discharge hydraulic pressure within the hydraulic system.

For the purpose of the hermetical sealing, O-rings 57, 58 and 59 are interposed between the spindle shaft 3 and the drawbar 6. Further, an O-ring 60 and 61 are disposed over the outer and inner peripheral surfaces of the piston 27 for avoiding liquid leakage.

With the arrangement thus organized, for the assembly of the tool 4 to the spindle device, after the pullstud 8 of the tool 4 is held by the tool holding member 7, the piston 27 is urged rearwardly by the biasing force of the coil spring 28, so that the piston as well as the drawbar 6 are moved rearwardly. Accordingly, the tool 4 engages the tool holding member 7. With maintaining this state, if the spindle shaft 3 is rotated about its axis, the rotation detector 54 generates an output signal indicative of the rotation, and the tool detector 56 generates an output signal indicative of the tool holding state. In response to these output signals, the pump of the liquid supplying unit is actuated for supplying the highly pressurized liquid into the fluid passage 5 through the rotary joint 41.

The thus supplied liquid in the fluid passage 5 is then distributed into the communication passage 42, the check valve 43 and the other communication passage 44 for supplying the liquid to the tool 4. Further, a part of the liquid is also distributed into the pressure chamber 25 through the communication passage 26. The liquid filled in the pressure chamber 25 urges the piston 27 rearwardly for further moving the drawbar 6 rearwardly. As a result, the engagement of the tool holding member 7 with the pullstud 8 is further ensured, to thereby provide stable connection of the tool 4 to the spindle shaft 3 as shown in FIG. 1.

Figure 2:
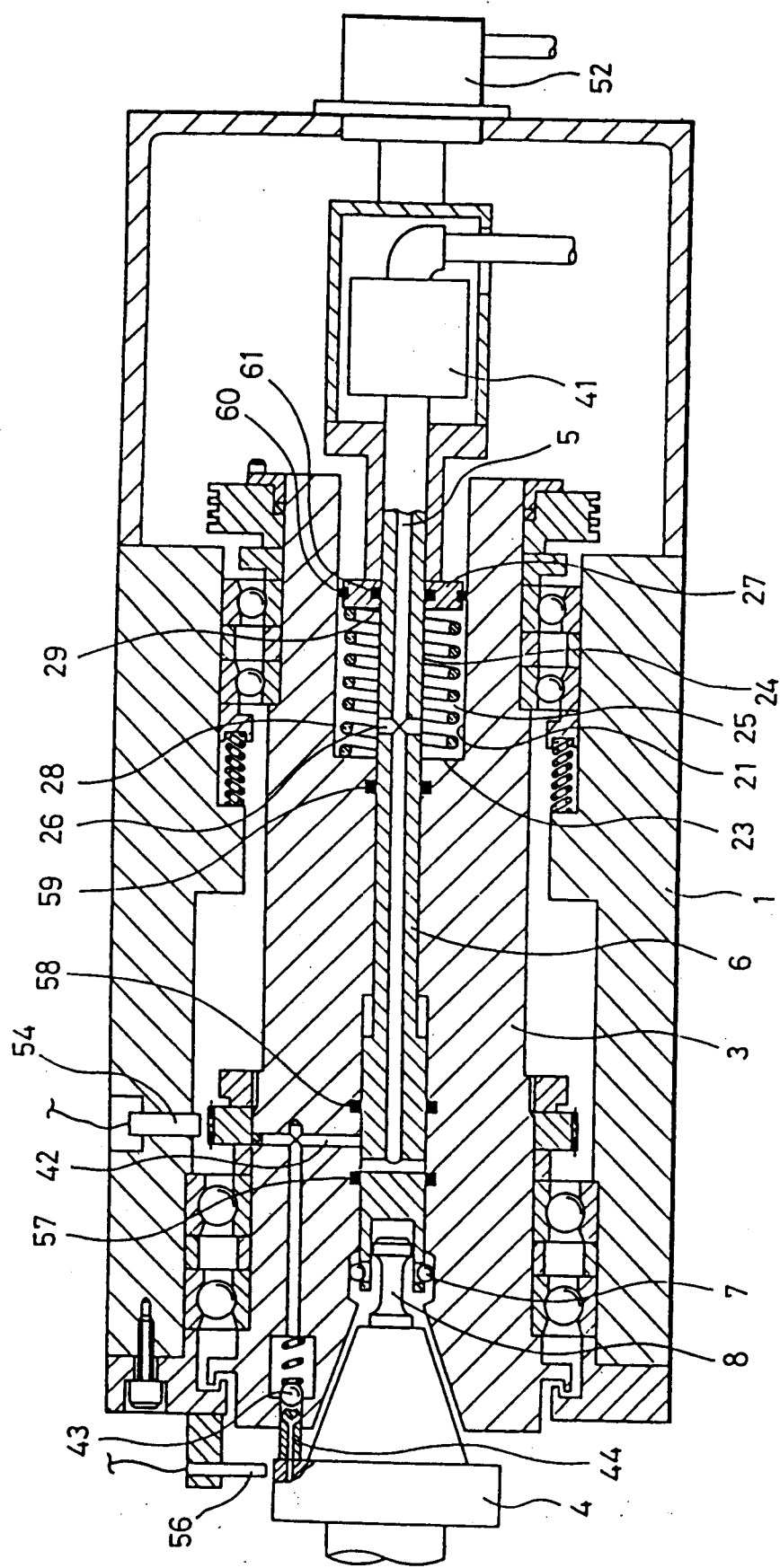
FIG. 2 is a cross-sectional view showing the spindle device in its tool releasing state according to the first embodiment.

On the other hand, for releasing the tool 4 from the spindle device, actually from the tool holding member 7, as shown in FIG. 2, the rotation of the spindle shaft 3 is stopped, so that the rotation detector generates an output signal indicative of the stopping of the rotation. In response to the output signal, the pump is deenergized, and the hydraulic pressure within the pressure chamber 25 is reduced to an atmospheric pressure. Subsequently, the hydraulic cylinder 52 is actuated so as to push the drawbar 6 and the piston 27 frontwardly against the biasing force of the coil spring 28. Consequently, the tool holding member 7 releases the pullstud 8 of the tool 4 for permitting the tool 4 to be disassembled from the spindle device. In this tool releasing state, the check valve 43 closes an inlet end of the communication passage 44, and therefore, the liquid leakage through the communication passage 44 can be prevented.

In the spindle device according to the first embodiment, the tool is not held by the spindle device by means of the biasing means having a strong biasing force, but is held by moving the drawbar 6 rearwardly by using the hydraulic pressure. Therefore, large biasing force of the biasing means, i.e., the coil spring 28 is not required. Therefore, only a small force is required for moving the drawbar 6 and, the used bearings do not undergo severe thrusting force. Furthermore, since a belleville spring is not used, any rotational imbalance does not occur at the time of high speed rotation of the spindle shaft, and any mechanical breakdown due to fatigue of the machine parts caused by the application of high load is prevented.

Incidentally, in the foregoing embodiment, if the machining liquid is not required for cutting or grinding, the communication hole 44 can be dispensed with. In this case, since leakage of highly pressurized liquid is avoidable because of the operation of the check valve 43, the pressure chamber 25 can provide sufficiently high hydraulic pressure, to thereby provide sufficient movement of the piston and the drawbar for stably clamping the tool by the tool holding member 7.

Further, incidentally, the coil spring 28 is used in the first embodiment. However, this spring 28 also can be dispensed with because of the rearward movement of the piston 27 by the hydraulic pressure applied in the pressure chamber 25. In other words, the coil spring 28 serves as an auxiliary means for providing the rearward movement of the piston if the hydraulic pressure is accidentally shut off.

Figure 3:
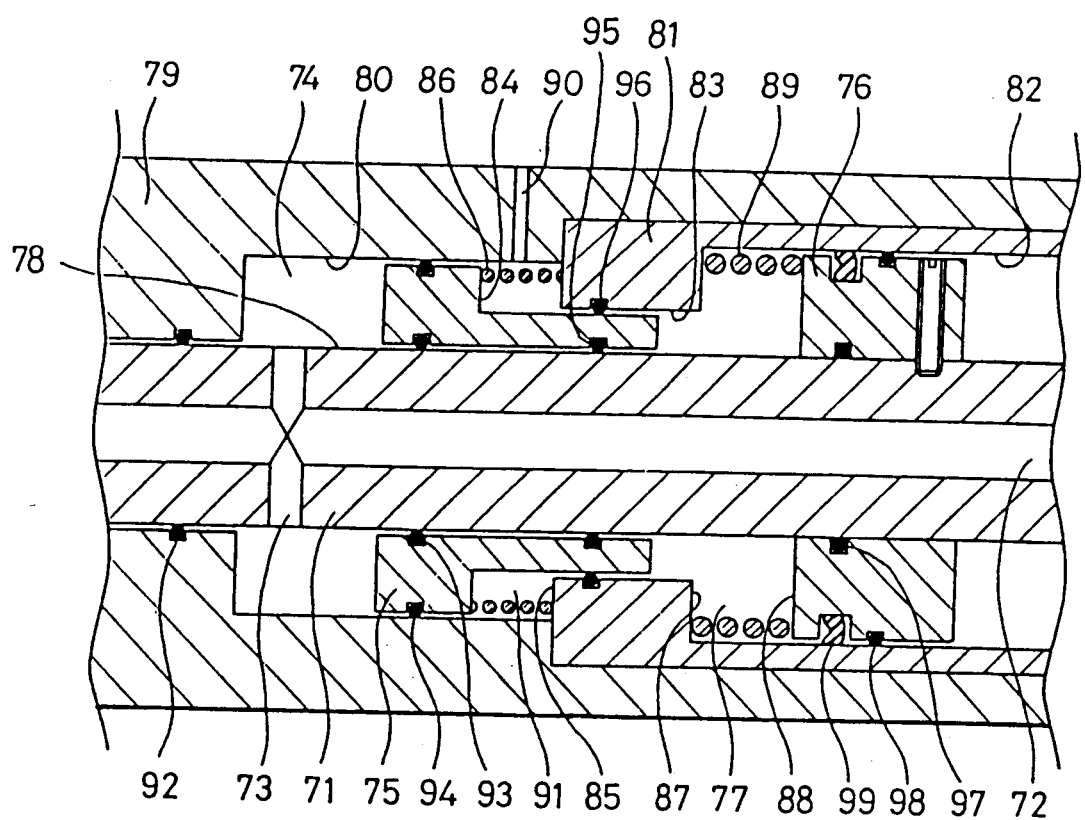
FIG. 3 is a cross-sectional view showing an essential portion of a spindle device according to a second embodiment of this invention.

A spindle device according to a second embodiment of this invention will next be described with reference to FIG. 3 wherein an essential portion of the spindle device is delineated. In the second embodiment, the pressure chamber 25 of the first embodiment is divided into a first pressure chamber 74 and a second pressure chamber 77 so as to provide a hydraulic pressure increasing system. More specifically, similar to the first embodiment, a fluid passage 72 is formed in a drawbar 71 extending in an axial direction thereof, and a radial communication passage 73 in communication with the fluid passage 72 is formed in the drawbar 71. A hollow space is defined between an outer peripheral surface 78 of the drawbar 71 and an inner peripheral surface 80 of a spindle shaft 79. The first pressure chamber 74 is provided at a portion of the hollow space and in communication with the communication passage 73. Within the hollow space, a free piston 75 is slidably provided in an axial direction thereof via an inner O-ring 93 and an inner oil seal ring 95 and an outer O-ring 94 and an outer oil seal ring 96. The free piston 75 has a large outer diameter portion and a small outer diameter portion positioned rearwardly of the large diameter portion. Further, a stepped surface 86 is defined at a boundary between the large and small outer diameter portions of the free piston 75. Therefore, the first pressure chamber 74 is defined by the outer peripheral surface 78 of the drawbar 71, the inner peripheral surface 80 of the spindle shaft 79 and a planar forward end face of the free piston 75.

The hollow space has a front small inner diameter portion and a rear large diameter portion. The large diameter portion of the free piston 75 is slidable with the small inner diameter portion of the hollow space. On the other hand, a sleeve 81 is positioned at the rear large inner diameter portion of the hollow space. The sleeve 81 has a front small inner diameter portion 83 and a rear large inner diameter portion 82. A stepped surface 87 is defined at a boundary between the small and large inner diameter portions of the sleeve 81. The rear small outer diameter portion of the free piston 75 is disposed slidable with respect to the front small inner diameter portion 83 of the sleeve 81, A return spring 86 is compressedly disposed over the small outer diameter portion of the free piston 75, and has a front end seated on the stepped portion 84 and a rear end seated on a front end face 85 of the sleeve 81.

An annular chamber 91 is defined by the stepped portion 84, the front end face 85 of the sleeve 81, the small diameter portion of the free piston 75 and the inner peripheral surface of the spindle shaft 79. The return spring 86 is positioned in the annular chamber 91.

A piston 76 (corresponding to the piston 27 in the first embodiment) is fixedly secured to the drawbar 71. The piston 76 is disposed slidable with respect to the rear large inner diameter portion 82 of the sleeve 81. Therefore, the second pressure chamber 77 is defined by the large inner diameter portion 82 of the sleeve 81, a front distal end face 88 of the piston 76 and the outer peripheral surface 78 of the drawbar 78. Further, a coil spring 89 is compressedly disposed over the drawbar 71 and has one end seated on the stepped surface 87 and another end seated on the front end face 88 of the piston 76.

The second pressure chamber 77 is hermetically maintained containing therein a working oil by O-rings 97, 98 and an oil seal ring 99. The O-rings 98 and the oil seal ring 99 are interposed between the outer peripheral surface of the piston 76 and the inner peripheral surface of the large inner diameter portion of the sleeve 81. On the other hand, the O-ring 97 is interposed between the inner peripheral surface of the piston 76 and the outer peripheral surface of the drawbar 71. The hermetic seal of the second pressure chamber 77 is also maintained by the oil seal rings 95 and 96. Incidentally, another O-ring 92 is provided between the spindle shaft and the drawbar 71.

With this arrangement, an area of the front end face of the free piston 75, the front end face being confronting with the first pressure chamber 74, is greater than an area of the rear end face of the free piston 75, the rear end face being confronting with the second pressure chamber 77. Further, a portion of the spindle shaft 79, the portion being confronting with the return spring 86 is formed with a radial air relief hole 90 which is in gas communication with the annular chamber 91. Therefore, the annular chamber 91 has an atmospheric pressure.

In operation, a part of the pressurized liquid supplied into the fluid passage 72 is entered into the first pressure chamber 74 through the communication passage 73. In accordance with the pressure increase in the first pressure chamber 74, the free piston 75 is urged rearwardly toward the second pressure chamber 77. Because of the movement of the free piston 75, the inner pressure of the working oil hermetically accumulated within the second pressure chamber 77 is also increased. Here, since the area of the front end face of the free piston 75 is set greater than that of the rear end face thereof, the hydraulic pressure within the second pressure chamber 77 becomes greater than that in the first pressure chamber 74. Therefore, increased urging force can be applied to the piston 76 fixed to the drawbar 71.

Accordingly, in the second embodiment, great gripping force can be generated for assembling the tool 4 to the spindle device in comparison with the force generated in the first embodiment. In other words, in the second embodiment, even if low hydraulic pressure is applied into the first pressure chamber 74, sufficient pressure is generated in the second pressure chamber 77 for urging the piston 76 rearwardly.

In the second embodiment, a single free piston 75 is provided for providing the first and second pressure chambers. However, a plurality of free pistons can be provided in the hollow space so as to provide a plurality of pressure chambers in order to successively increase hydraulic pressure in the order of the successive pressure chambers.

As described above, in the spindle device according to the present invention, as the drawbar is moved in its axial direction by the application of hydraulic pressure, sufficient tool holding force can be generated irrespective of the employment of a mechanical biasing means such as a spring. Further, according to the second embodiment of this invention, since the free piston which divides the hollow space into the first and second pressure chambers has the front end face and rear end face, and the area of the front end face is greater than that of the rear end face, hydraulic pressure within the second pressure chamber becomes higher than that of the first pressure chamber. Therefore, even if low pressure is applied to the first pressure chamber, sufficient hydraulic pressure within the second pressure chamber can be generated for urging the piston, to thereby securely hold the tool with the sufficient holding force.

While the invention has been described in detail and with reference to specific embodiments thereof, it would be apparent to those skilled in the art that various changes and modifications can be made therein without departing from the spirit and scope of the invention.

What is claimed is:

1. A spindle device for holding a tool for use in a machine tool, including a spindle shaft rotatably provided about its axis, and a drawbar extending through the spindle shaft and disposed slidable in an axial direction thereof relative to the spindle shaft for holding the tool, the drawbar having an outer peripheral surface, the improvement comprising;

the drawbar being formed with a fluid passage,
a hollow space being defined between the outer peripheral surface of the drawbar and an inner peripheral surface of the spindle shaft;
a piston fixedly coupled to the drawbar and disposed slidable in the hollow space;
a pressure chamber being defined by the inner and outer peripheral surfaces and the piston, the fluid passage being in fluid communication with the pressure chamber: and
liquid supply means connected to the fluid passage for supplying pressurized liquid into the pressure chamber for urging the piston and the drawbar in a direction for holding the tool.

2. The spindle device as claimed in claim 1, wherein the spindle shaft has a rear portion formed with a cylindrical recess having a cylindrical surface and a bottom surface, the piston being positioned in the cylindrical recess and the pressure chamber being defined by the cylindrical recess and the piston.

3. The spindle device as claimed in claim 2, wherein the fluid passage extend substantially along a length of the drawbar, and wherein the drawbar is formed with first and second radial communication passages, the first passage providing a fluid communication between the pressure chamber and the fluid passage for applying hydraulic pressure into the pressure chamber, and the second passage providing a communication between the fluid passage and the tool for supplying a part of the liquid to the tool.

4. The spindle device as claimed in claim 2, further comprising a mechanical biasing means disposed in the pressure chamber for urging the piston in the direction for holding the tool, the biasing means assisting the movement of the piston in the direction.

5. The spindle device as claimed in claim 4, further comprising a hydraulic cylinder connectable to the drawbar for moving the same in a direction for releasing the tool.

6. The spindle device as claimed in claim 1, further comprising at least one free piston positioned in the hollow space for dividing the pressure chamber into a first pressure chamber and a second pressure chamber, the first pressure chamber being in fluid communication with the fluid passage, and the second pressure chamber being positioned close to the piston connected to the drawbar and being hermetically sealed for containing therein a liquid, the free piston being slidable in the hollow space and having a front end surface confronting the first pressure chamber and a rear end surface confronting the second pressure chamber, an area of the front end surface being greater than that of the rear end surface.

7. The spindle device as claimed in claim 6, wherein the inner peripheral surface of the spindle shaft has a small inner diameter portion and a large diameter portion, and wherein the free piston has a large outer diameter portion and a small outer diameter portion, the large outer diameter portion defining the front end surface and being slidable with the small inner diameter portion of the spindle shaft, and further comprising a sleeve member positioned at the large inner diameter portion of the spindle shaft, the sleeve member having a small inner diameter portion and a large inner diameter portion, and the small outer diameter portion of the free piston defining the rear end surface and being slidable on the small inner diameter portion of the sleeve member, the piston fixedly coupled to the drawbar being slidable on the large inner diameter portion of the sleeve member.

8. The spindle as claimed in claim 1, wherein the fluid passage extends to the tool for supplying the liquid to the tool.

* * * * *